United States Patent [19]

Francombe et al.

[11] 3,808,674

[45] May 7, 1974

[54] EPITAXIAL GROWTH OF THERMICALLY EXPANDABLE FILMS AND PARTICULARLY ANISOTROPIC FERRO-ELECTRIC FILMS

[75] Inventors: Maurice H. Francombe; Shu Y. Wu; William J. Takei, all of Pittsburgh, Pa.

[73] Assignee: Westinghouse Electric Corporation, Pittsburgh, Pa.

[22] Filed: Aug. 10, 1972

[21] Appl. No.: 279,563

[52] U.S. Cl. .................. 29/590, 29/446, 117/213, 117/7, 148/175

[51] Int. Cl. .................. B01j 17/00

[58] Field of Search .................. 29/446, 576, 590, 591; 117/213, 7, 54; 148/175

[56] References Cited

UNITED STATES PATENTS

| | | | |
|---|---|---|---|
| 2,299,778 | 10/1942 | Wissler | 29/446 |
| 3,201,275 | 8/1965 | Herrick | 117/213 |
| 3,433,684 | 3/1969 | Zanowick | 148/175 |
| 3,556,832 | 1/1971 | Park | 117/17 |

*Primary Examiner*—W. C. Tupman
*Attorney, Agent, or Firm*—C. L. Menzemer

[57] ABSTRACT

A coherent, preferably thick film is epitaxially grown on a substrate with a different coefficient of expansion from the film by straining the substrate by bending, epitaxially growing the film on the substrate, and cooling the substrate and film while relieving the strain from the substrate to compensate for stresses formed in the film by the differential in thermal expansion between the substrate and the film. The method is particularly useful where a coherent, epitaxial film with a large anisotropy in thermal expansion is desired. Further, by this method a thick, untwinned coherent film of (010) crystallographically oriented ferroelectric bismuth titanate is epitaxially grown on a (110) oriented spinel crystal substrate.

4 Claims, 6 Drawing Figures

PATENTED MAY 7 1974 3,808,674

SHEET 2 OF 2

EPITAXIAL GROWTH OF THERMICALLY EXPANDABLE FILMS AND PARTICULARLY ANISOTROPIC FERRO-ELECTRIC FILMS

GOVERNMENT CONTRACT

The present invention was made in the course of or under United States Government Contract No. F 33615-71-C-1268.

FIELD OF THE INVENTION

THe present invention relates to the epitaxial growth of films and particularly ferroelectric films that have large anisotropy in thermal expansion.

BACKGROUND OF THE INVENTION

In the epitaxial growth of certain films, it is sometimes necessary to grow the film on a substrate of a certain composition at a certain temperature and then to cool the film and substrate to a lower temperature, for example, to provide a desired crystal formation in the film. This has not, however, been possible heretofore in certain instances because of the difference in thermal expansion of the substrate and the film. On cooling, the film would crack and sometimes peel resulting in loss of the desired properties in the film.

Single-crystal bismuth titanate ($Bi_4Ti_3O_{12}$) is a ferroelectric material which exhibits unique electrical-optical behavior. It has been found in the flux-grown bulk crystals that the axis of the optical indicatrix, which in the *a–c* plane of the monoclinic crystal, can be rotated through about 50° simply by switching the component of ferroelectric field parallel to the crystallographic *c* axis, see S. E. Cummins and L. E. Cross, "Electrical and Optical Properties of Ferroelectric $Bi_4Ti_3O_{12}$ Single Crystals", J. Appl. Phys. 39, 2268 (Apr., 1968). On switching therefore a resultant change of 40° in the extinction position of the orthogonal light polarization axes and in turn a near-optimum change in the intensity of the transmitted light occurs. These properties make bismuth titanate crystals uniquely suited for high-contrast display systems and optical memory systems, see S. E. Cummins, Proc. IEEE, 55, 1536, 1537 (Aug., 1967), and U.S. Pat. No. 3,374,473.

Unfortunately, it is necessary for the light to be incident on a particular crystallographic plane, i.e. the monoclinic (010) plane of the crystal, to fully exploit the optical switching properties. Flux-grown bulk crystals of bismuth titanate have been found to possess a thin lamellar habit in which the *a–c* crystal face lies perpendicular to the large (001) face of the lamella and thus is available only in the form of a very narrow rectangle. To produce a matrix area suitable for a display system or memory storage from such crystals, it is necessary therefore to stack narrow slices of bismuth titanate crystals cut parallel to the (010) plane in a side-by-side array. Such a procedure is time-consuming and commercially unfeasible.

It has been suggested that the difficulty could be eliminated by preparing more nearly uni-axed crystal films by epitaxial growth on substrates of a particular composition and crystallographic orientation. Using RF sputtering techniques, with ceramic targets containing excess bismuth trioxide ($Bi_2O_3$) relative to stoichometric amounts needed to form bismuth titanate, epitaxially grown bismuth titanate films with the desired (010) crystal orientation were produced on (110) oriented magnesium oxide (MgO) crystal substrates; see W. J. Takei, M. P. Formigoni and M. H. Francombe, "Preparation and Epitaxy of Sputtered Films of Ferroelectric $Bi_4Ti_3O_{12}$", V. Vac. Sci. & Tech. 7, 442 (Nov., 1970). However, the crystal structure of these epitaxially grown bismuth titanate films were statistically divided into "domains" or crystal regions of (010) and (100) crystallographic orientations. The only way in which such twinning could be eliminated to produce the essentially pure (010) orientation was to remove the film from the substrate and anneal. While larger areas of the desired crystal orientation can be produced by this method than by flux-grown bulk methods, many of the potential advantages of the thin film technique are lost by the need to remove the film from the substrate for annealing.

The present invention overcomes these difficulties and disadvantages. It provides epitaxially grown bismuth titanate films of (010) crystallographic orientation without substantial twinning. It also provides a means of epitaxially growing specified films on specified substrates wherein the films and substrate have different thermal coefficients of expansion.

SUMMARY OF THE INVENTION

A film is epitaxially grown on a substrate having a different coefficient of thermal expansion from the film wherein, as part of the epitaxial processing, the film and substrate are cooled, for example, through a Curie temperature to impart the desired properties to the composite. The substrate is strained prior to the epitaxial growth by bending so that stresses subsequently introduced into the film by cooling are compensated by the straightening of the substrate.

The strains introduced into the substrate can be used to compensate for stresses developed in the epitaxially grown film in two ways. First, the bending stresses present in the substrate can be relieved incrementally causing displacement. Second, the Young's modulus of the substrate can be changed automatically on cooling to stiffen the material and result in relief of the strain.

The present invention is most useful where the thermal expansion of the film is anisotropic. However, isotropic thermal expansion can be compensated by straining the substrate in two dimensions instead of one dimension. Compensation in the third dimension is not necessary because it is perpendicular to the surface forming the interface between the film and the substrate.

Epitaxial growth by stress compensation has particular utility in forming thick films (greater than 5 microns) of ferroelectric bismuth titanate on (110) spinel substrates. Moreover, epitaxially grown ferroelectric bismuth titanate films grown on (110) spinel substrates have been found to contain crystals with (010) crystallographic orientation without significant twinning with crystals with the (100) orientation. The optical quality is observed to be superior to previously epitaxially grown twinned bismuth titanate films in that there is less light scattering in the film. The epitaxial technique is the same as that previously utilized in growing twinned bismuth titanate films on magnesium oxide (MgO) crystal substrates in the (110) crystallographic orientation.

The difficulty with epitaxially growing a (010) oriented ferroelectric bismuth titanate film on a (110) oriented spinel crystal substrate is that the film has an anisotropic coefficient of thermal expansion along the crystallographic *c* axis and to obtain the ferroelectric phase the film and substrate must be cooled from a preparation temperature, e.g. 700–750° C., through a Curie temperature at approximately 670–675° C. Films greater than 5 microns in thickness have been observed to crack and peel on cooling, yet these thicker films are generally required to provide effective high contrast optical switching. By straining the substrate prior to the start of epitaxial growth and subsequently relieving the strain to compensate for stresses developed in the film on cooling, a coherent ferroelectric bismuth titanate film of greater than 5 microns in thickness can be epitaxially grown on (110) oriented spinel substrates.

Other details, objects and advantages of the invention will become apparent as the following description of the present preferred embodiments and present preferred methods of practicing the same proceeds,

BRIEF DESCRIPTION OF THE DRAWINGS

In the accompanying drawings, the present preferred embodiments of the invention and present preferred methods of practicing the invention are illustrated in which.

DESCRIPTION OF THE PREFERRED EMBODIMENTS

Figures 1, 2, 3, 4:
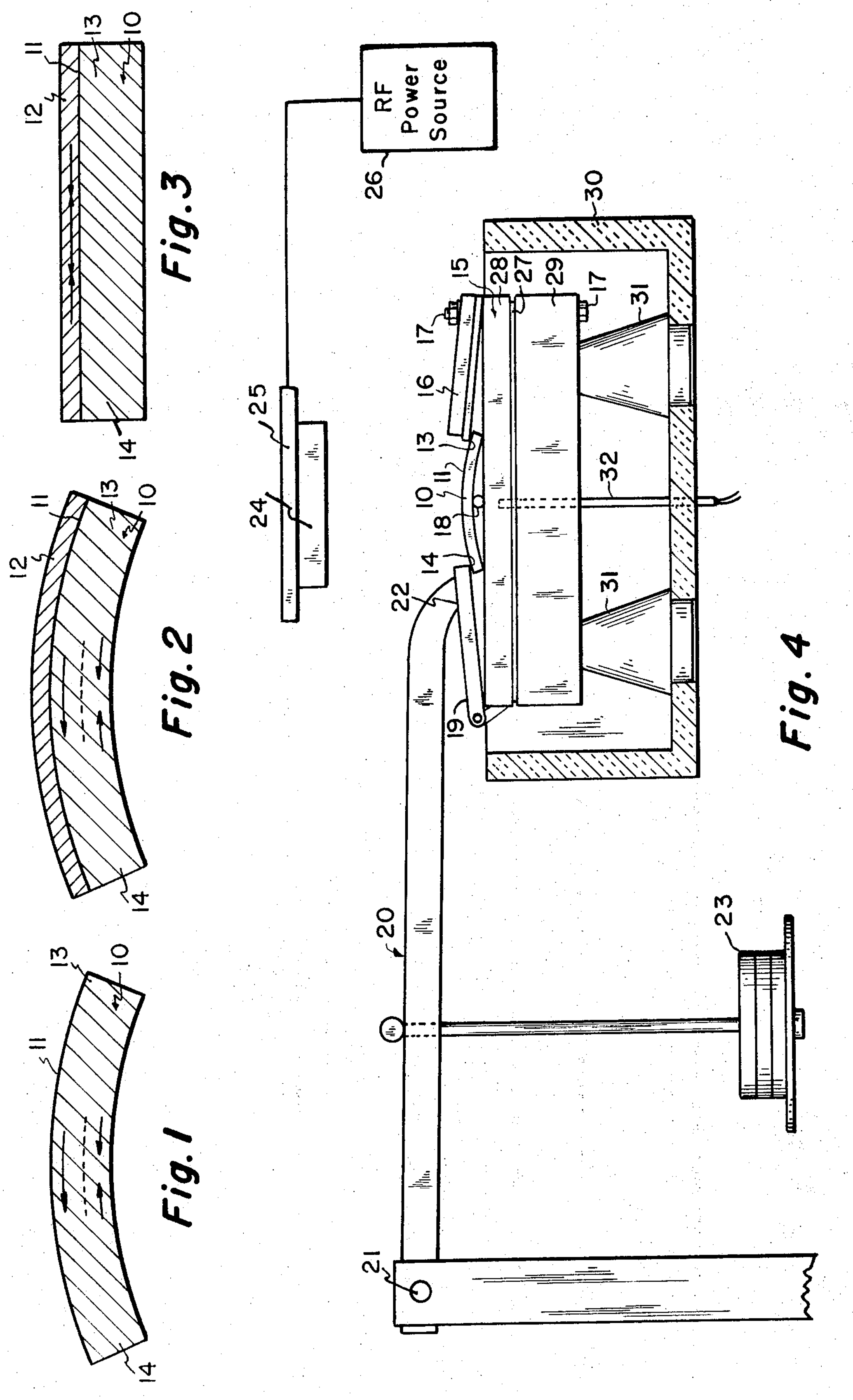
FIG. 1 is an elevational view in cross-section of a strained, (110) oriented spinel crystal substrate.
FIG. 2 is an elevational view in cross-section of strained, (110) oriented spinel crystal substrate having a coherent (010) oriented bismuth titanate film epitaxially grown thereon at preparation temperature.
FIG. 3 is an elevational view in cross-section of a composite composition of a (110) oriented spinel crystal substrate with an untwinned ferroelectric bismuth titanate film in the (010) crystallographic orientation thereon.
FIG. 4 is an elevational schematic of apparatus suitable for performing and making the present invention.

Referring to FIG. 1, a single spinel crystal substrate 10 is prepared with planar surface 11 in the (110) crystallographic orientation. The spinel substrate 10 is preferably magnesium aluminate ($MgAl_2O_4$). This material can exist in a wide range of compositions. It can have the formuls MgO *x* $Al_2O_3$ where *x* can have values between about 0.64 and 6.7. A commercial single-crystal spinel magnesium aluminate is available in which *x* equals approximately 3.3 and spinel magnesium aluminate of this composition is readily grown by a flame fusion method, see U.S. Pat. No. 3,658,586. The grown substrates are cut, lapped and polished by well-established procedures to provide surface 11 with the (110) crystallographic orientation.

Substrate 10 is stressed as shown by the arrows in FIG. 1 by elastic straining of the substrate with apparatus as shown in FIG. 4. Referring to FIG. 4, substrate 10 is first positioned with its edge portion 13 rigidly fixed between heating unit 15 and clamp 16, clamp 16 being fastened to heating unit 15 by bolt assembly 17. A quartz fiber rod 18 is then positioned between the substrate 10 and heating unit 15 transverse the center of the substrate. Hinged clamp 19 is then positioned in contact with edge portion 14. Weight assembly 20 is then positioned via pivot 21 in contact with the upper surface of hinged clamp 19 at 22 and weights 23 added to assembly 20 to bend edge portion 14 of substrate 10. By this arrangement, substrate 10 is elastically strained to the subsequently needed displacement. It should be noted that the straining is in the direction to compensate for the anisotropy of the thermal expansion on cooling of the film epitaxially grown on surface 11 as hereinafter described.

Referring to FIG. 2, bismuth titanate film 12 with a (010) crystallographic orientation is epitaxially grown on planar surface 11 of substrate 10 by a RF sputtering technique. This RF technique is the same as that previously reported for growing twinned bismuth titanate film on (110) oriented magnesium oxide (MgO), see W. J. Takei, M. P. Formigoni and M. H. Francombe, "Preparation and Epitaxy of Sputtered Films of Ferroelectric $Bi_4Ti_3O_{12}$", V. Vac. Sci. & Tech. 7, 442 (Nov., 1970). Other deposition techniques such as vaporization may, however, be suitable.

In the present embodiment, RF sputtering using a ceramic target containing 80% $Bi_4Ti_3O_{12}$ and 20% $Bi_{12}TiO_{20}$ was used. The apparatus used is seen by reference to FIG. 4. The ceramic target 24 is disposed above the substrate 10 with an area in excess of the substrate and mounted on a water cooled aluminum plate 25. The plate 25 is in turn electrically connected to a suitable RF power source 26. The preparation temperature is provided for the substrate 10 by heating unit 15 which is comprised of a platinum plate 27 laminated between boron nitride blocks 28 and 29. The unit 15 is then operated by supplying electrical power to plate 27 to resistance heat the unit 15 and the substrate 10. The heating unit 15 is mounted in insulating enclosure 30 by supports 31 to reduce the loss of heat to the surrounding, and thermocouple 32 is positioned through the heating unit 15 to provide continuous measurement of the preparation temperature. Also the entire assembly is placed in a vacuum or inert atmosphere within a chamber (not shown).

A typical deposition rate of bismuth titanate on the substrate 10 with the described apparatus is 50 Angstroms per minute. This rate was obtained with a 10 cm. sq. target, mounted on plate 25 at a distance from the substrate 10 of 4 cm., deposition temperature 700–750° C., power level 1 watt/$cm^2$, self bias 700 V, forward-to-reflected power ratio greater than 20, and an atmosphere of 3 m torr argon and 4 m torr $O_2$ introduced after a background vacuum of $5 \times 10^{-7}$ had been established.

Figure 6:
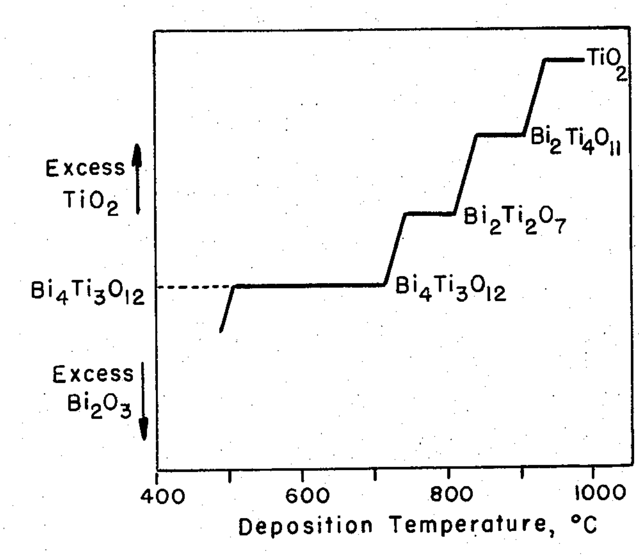
FIG. 6 is a graphic schematic showing the dependence of composition on substrate temperature for bismuth titanate film grown by RF sputtering from a target of composition 80% $Bi_4Ti_3O_{12}$, 20% $Bi_{12}TiO_{20}$.

Films grown from ceramic targets of stoichiometric composition were deficient in $Bi_2O_3$, regardless of the substrate temperature used. However, by using the bismuth-oxide rich targets the desired $Bi_4Ti_3O_{12}$ films compositions could be obtained by suitably adjusting the substrate temperature. The situation is analogous to that reported and studied by Guenther and other workers in III–V compound films prepared by co-evaporation, see K. G. Guenther, "Interfacial and Condensation Processes Occurring with Multicomponent Vapours" in The Use of Thin Films in Physical Investigations (ed. C. Anderson) p. 213, Academic Press, London (1966). At low substrate temperatures, compounds formed on the substrate are rich in the more volatile $Bi_2O_3$ component, relative to $Bi_4Ti_3O_{12}$. As the temperature is increased a stoichiometric temperature interval is entered, within which the desired $Bi_4Ti_3O_{12}$ ferroelectric compound is stable and excess $Bi_2O_3$does not stick, see FIG. 6. At higher temperatures this compound is no longer stable and the sticking coefficient of $Bi_2O_3$ is lowered so that the thermodynamically more stable $Bi_2Ti_2O_7$ compound is favored. As the substrate temperature is raised progressively, new "stoichiometric" interval regions are observed corresponding to compounds richer in the less volatile $TiO_2$ component, see FIG. 6. Fortunately, it turns out that the temperature range within which the stoichiometric $Bi_4Ti_3O_{12}$ compound is formed corresponds also to the range within which epitaxial growth can be achieved.

By this epitaxial technique, bismuth titanate films in thicknesses ranging up to 25 microns and greater essentially free of *a–b* twinning and possessing the (010) crystallographic orientation can be obtained.

Referring to FIGS. 3 and 4, the substrate 10 and film 12 are cooled from the preparation temperature of 700–750° C. through the Curie temperature at about 670–675° C. At the Curie temperature, the paraelectric-ferroelectric phase change occurs establishing the crystallographic difference between the *a* and *b* axes (above this temperature the structure is tetragonal and these axes are equivalent) and the ferroelectric properties of the bismuth titanate film. Since the lengths of two axes change abruptly and in difference senses at this transition, anisotropic stresses develop in the film along the *c*-axis The substrate 10 as previously stated was oriented so that the bending strains were applied along the *c*-axis of the bismuth titanate film. The relief of these strains during the cooling through the Curie temperature can thus compensate for the stresses developed by anisotropic thermal contraction of the film. The stress compensation can be performed in two ways.

Figure 5:
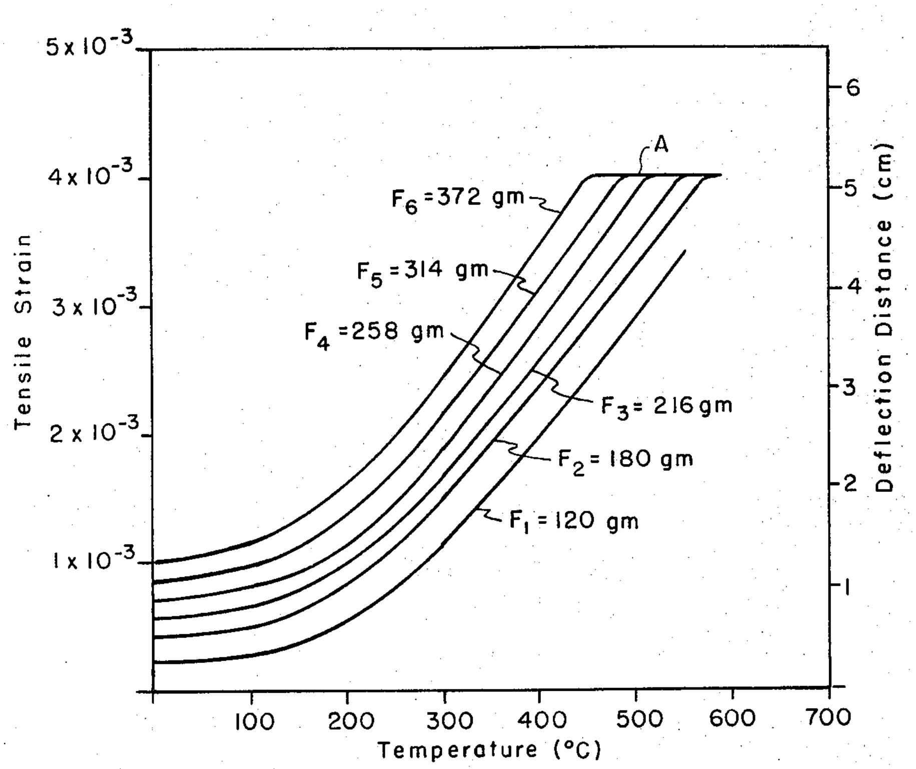
FIG. 5 is a graph showing the change in Young's modulus with temperature of spinel magnesium aluminate.

One way is to physically remove weights 23 incrementally during the cooling process to remove the stress in the substrate and in the strain. This will permit the maximum amount of compressive stress to be applied to the film. The limitation on the applied compressed stress is the breaking stress of the substrate at the preparation temperatures. However, means of relieving the stress on the substrate requires manipulation of the weights 23 within a vacuum chamber of breaking of the vacuum. A better means would be to take advantage of the variation of Young's modulus with temperature. FIG. 5 shows measured variations in substrate strain as a function of temperature for various applied constant stresses. It shows that the substrate straightens upon cooling as it becomes stiffer; point A was the limit of displacement because the substrate bent into contact with the heating unit 15 (with an 8 mil diameter quartz fiber rod 18). Thus a convenient mode of operation would be to slowly cool the film 12 and substrate 10 composite to automatically relieve the strain on the substrate with the compressive-compensating stress being in turn applied to the film in a continuous manner.

Both modes of operation have been used in the preparation of bismuth titanate films and provided similar results thus far. By using the bent substrate technique, it has been possible to grow thick films (i.e. greater than 5 microns) which are cracked but show good adherence to the substrate. The quality of the films is demonstrated by the fact that the films show good electrical and optical switching, whereas with prior art films on magnesium oxide substrates, even the electrical switching was poor. Elimination of the cracking is desirable but not necessary as shown by the fact that the film safely withstood the subsequent electroding processing step. The cracked interface does not contribute any significant light depolarization, which would degrade the optical performance.

The effectiveness of the strained substrate technique has been demonstrated for bismuth titanate but could be used for any film/substrate combination with a large difference in thermal expansion coefficients in one or more directions. Unidirectional thermal expansions would arise when it is desired to prepare a particular epitaxial film (or use a particular substrate) with a large anisotropy in the thermal expansion. It is also possible to match and compensate in two directions by bending the substrate in the form of a dome. In addition, by applying a bend in the opposite or reverse direction to the substrate, it is possible to apply a compensating tensile stress to the film when the coefficient of thermal expansion of the substrate was greater than the coefficient of thermal expansion of the film.

In summary, a method is described for producing single-orientation (*a–c* oriented), optical-quality epitaxial layers of ferroelectric bismuth titanate on spinel substrates and for employing a stress-compensation method to permit the growth of adherent layers thicker than 5 microns suitable for optical display purposes. The stress compensation technique could be extended to the growth of adherent layers of other materials within the scope of the following claims.

What is claimed is:

1. A method of epitaxially growing a coherent film on a substrate having a different coefficient of thermal expansion from the film comprising the steps of:

a. straining a planar substrate by bending;

b. epitaxially growing a film having a different coefficient of thermal expansion on the strained substrate;

c. cooling the film and substrate; and d. relieving the strain from the substrate during the cooling to compensate for stresses formed in the film by the differential in thermal expansion between the film and the substrate.

2. A method of epitaxially growing a coherent film on a substrate having a different coefficient of thermal expansion as set forth in claim 1 wherein:

steps (c) and (d) are performed simultaneously by a change in Young's modulus of the substrate on cooling.

3. A method of forming coherent bismuth titanate film on a substrate comprising the steps of:

a. forming a spinal crystal substrate having a planar surface thereon in the (110) crystallographic orientation;

b. straining the spinal crystal;

c. epitaxially growing bismuth titanate on said (110) oriented planar surface;

d. cooling the grown film from a preparation temperature through a Curie temperature to provide ferroelectric properties in the film and an untwinned (010) crystallographic orientation; and e. relieving the strain from the spinel crystal during cooling to compensate for stresses formed in the film by the differential in thermal expansion between the spinel crystal and the bismuth titanate film.

4. A method of epitaxially growing a coherent film on a substrate having a different coefficient of thermal expansion as set forth in claim 1 wherein:

the substrate consists essentially of magnesium aluminate ($Mg Al_2 O_4$); and the grown film is bismuth titanate.

* * * * *